Jan. 31, 1933.  E. R. PERRY  1,896,011
AGRICULTURAL IMPLEMENT
Filed Nov. 3, 1930  2 Sheets-Sheet 1
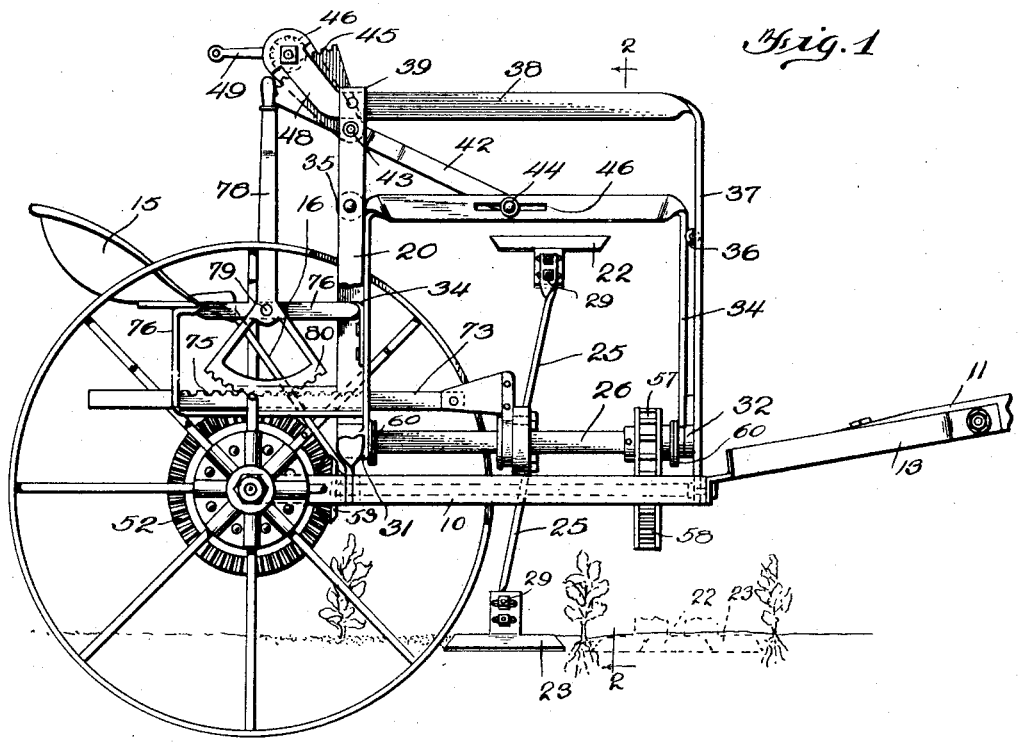

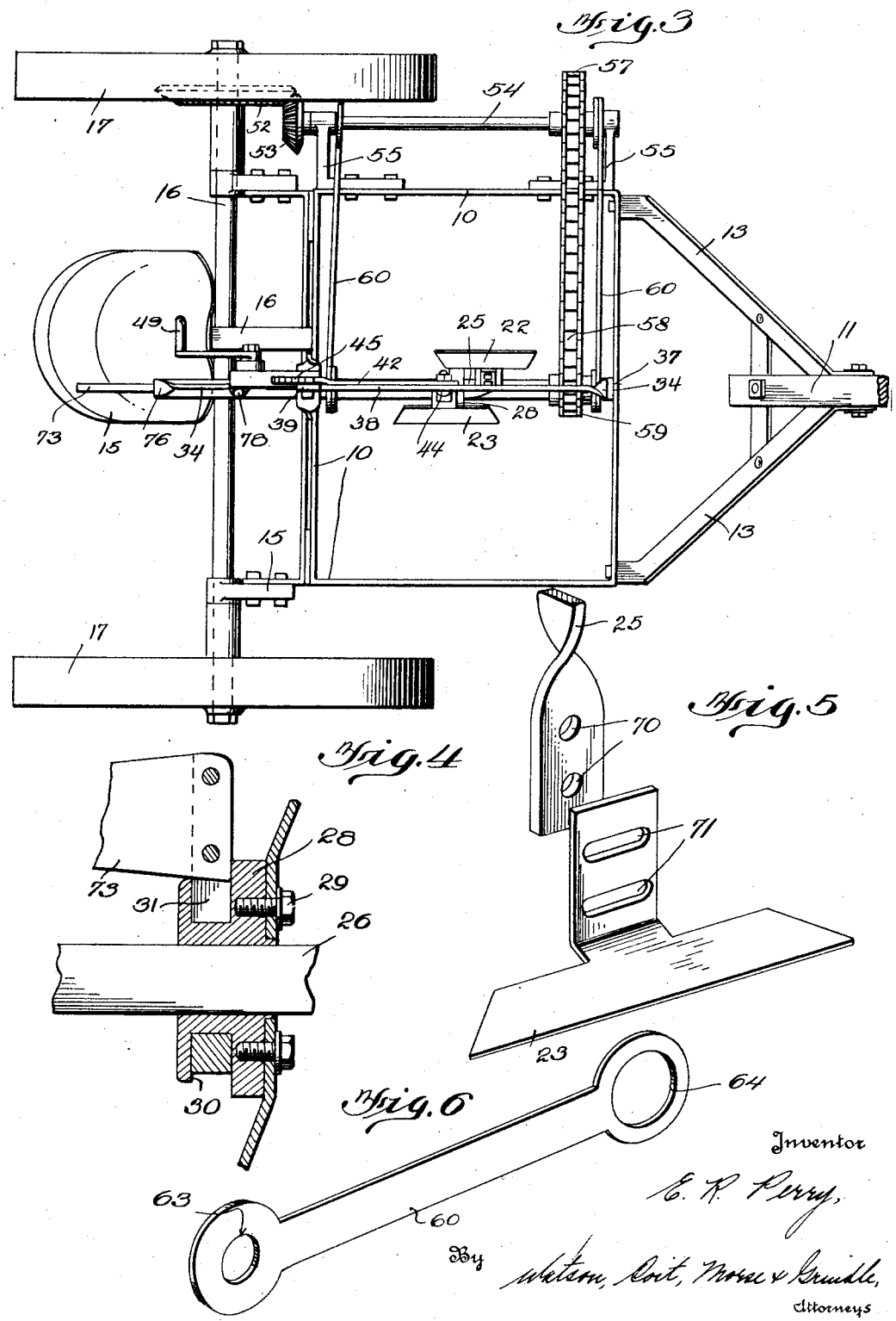

Patented Jan. 31, 1933

1,896,011

UNITED STATES PATENT OFFICE

EDWARD R. PERRY, OF HARTSVILLE, SOUTH CAROLINA

AGRICULTURAL IMPLEMENT

Application filed November 3, 1930. Serial No. 493,081.

This invention relates to agricultural implements for the cultivation of the soil and more particularly to implements for use in the cultivation of cotton plants, sometimes referred to as cotton choppers.

The principal object of the invention is the provision of an implement of this character by means of which the soil intermediate the adjacent plants in a row may be effectively and rapidly broken up without injury to the plants. It has heretofore been proposed to construct a machine of this character in the form of a wheeled carriage having revolving blades driven from the traction wheels, but considerable difficulty has been experienced by reason of the fact that the plants are seldom spaced uniformly and no satisfactory arrangement has yet been evolved whereby the blades can be manipulated to prevent injury to the irregularly spaced plants and at the same time operated in such manner as to effectively break up the soil over the entire space between the adjacent plants. Further difficulty has been experienced by reason of the irregular contour of the ground over which the machine is drawn since it is important that the cutting blades should penetrate the soil to a uniform depth.

It is accordingly a further object of the invention to eliminate these difficulties attendant upon the operation of cultivating machines by providing a machine having revolving blades, which is so designed that at least two cuts will be made between each adjacent pair of plants, the position of the blades being adjustable so that the cuts may overlap to a greater extent when the plants are closely spaced and to a less extent when the plants are further apart and in which the height of the cutting blades as they meet the soil may be readily and accurately adjusted to ensure a uniform depth of cut.

Further objects and features of the invention will be apparent from the following description taken in connection with the accompanying drawings, in which Figure 1 is an elevational view of one form of machine constructed in accordance with the principles of the present invention and designed for the cultivation of cotton and similar plants;

Figure 2 is a section on the line 2—2 of Fig. 1;

Figure 3 is a plan view of the machine illustrated in Figure 1;

Figure 4 is a partial sectional view illustrating one manner of supporting the revolving blades;

Figure 5 is a fragmentary detailed view of a cutting blade illustrating the manner in which the blade may be adjusted to the approximately correct position before the machine is put in operation; and Figure 6 is a detailed perspective view of one element of the machine.

As mentioned hereinbefore, the present invention is applicable principally to the cultivation of plants arranged in spaced rows in which there is an appreciable distance between the adjacent plants in each row, for instance cotton plants, and while the machine will be hereinafter described for the sake of conciseness as applied to such use, it will be understood that a number of the features of the present invention are applicable to cultivators of other types.

Referring now specifically to the drawings, it will be noted that the machine comprises a substantially rectangular frame 10, at the forward end of which is secured a draft pole 11 by means of which the machine may be drawn by tractor or horse, the draft pole being preferably secured to the frame 10 by suitable brace members 13. Bearing members 15 are secured at the rear of the frame in which an axle 16 is mounted, this axle carrying traction wheels 17 in a conventional manner. An operator's seat 15 is also carried at the rear of the frame 10 by means of an arm 16 secured to the frame and to the seat. A vertically extending guide member 20 is secured adjacent the center of the rear portion of the frame 10, this guide member preferably consisting of a single metal bar or strap which is bent reversely to form a fork to permit vertical displacement of certain moving parts of the machine between the arms thereof, these arms being secured to the frame member 10 as shown at 21.

The rotating cutting blades are illustrated at 22 and 23, these blades being supported on arms 25 which are carried on and rotatable with a shaft 26 extending longitudinally of the machine. While only two blades are shown, it will be appreciated from the following description of the invention that a greater number of blades may be provided if desired. The preferred manner of mounting the arms 25 on the shaft 26 is illustrated in Figure 4 in which a collar 28 to which the blades are secured by the bolts 29 is slidably and non-rotatably mounted on the shaft 26 and is provided with an annular groove 30 within which a fork 31 extends. The collar 28 may be splined to the shaft 26 but in the drawings the shaft is illustrated as squared and the collar as provided with a correspondingly shaped aperture having a somewhat loose fit on the shaft.

The shaft 26 is preferably supported for rising and falling movement and may be journalled in bearings 31, 32 at each end thereof, one of these bearings being arranged for vertical movement within the forked arms of the guide member 20. Preferably the two bearings are connected by a substantially U-shaped frame 34 which engages both bearings, the rearward leg of this frame engaging a roller 35 mounted between the forked arms of the guide member 20 and the forward leg of this frame engaging a similar roller 36 carried by an upright member 37 which is in turn secured to the mid portion of the forward side of the frame 10. In order to strengthen the construction the upright member 37 may be provided with an integral rearwardly extending portion 38 which is secured to the upper portion of the guide member 20 at 39.

It will now be seen that the shaft 26 and the blades carried thereby together with the frame 34 are movable vertically so that the depth of cut may be adjusted. A convenient arrangement for positioning these vertically moving parts is shown in Figure 1 of the drawings and comprises a lever 42 pivoted at 43 and provided with a roller 44 engaging in a slot 46 in the upper longitudinally extending portion of the U-shaped frame 34. The lever 42 is extended beyond the point of pivotal support 43 and is preferably provided with an arcuate toothed segment 45 which meshes with a pinion 46. The pinion 46 is in turn rotatably carried on an arm 48 rigidly secured to the upper end of the guide member 20 and is provided with a handle 49 so that rotation of the pinion serves to elevate and depress the lever 42 to raise and lower the frame 34, the shaft 26 and the blades carried thereon. In order to prevent unintentional displacement of the shaft 26 and associated parts some conventional form of irreversible mechanism of the type which is usually provided in connection with the mechanism for raising and lowering automobile windows may be associated with the journal bearings for the handle 49 and pinion 46.

As shown in Figures 1 and 3 of the drawings, a bevel pinion 52 is bolted or otherwise secured to one of the traction wheels 17 of the vehicle and this gear meshes with a second bevel gear 53 which is secured to a shaft 54 carried in bearings 55 which are preferably bolted to the frame 10 or to an extension thereof. A toothed sprocket 57 is mounted on the forward end of the shaft 54 and is connected by a sprocket chain 58 to a second toothed sprocket 59 non-rotatably secured to the shaft 26. The chain 58 is somewhat loose and permits vertical adjustment of the shaft 26 and the blades carried thereby without interrupting the drive and it will be observed that as long as the vehicle is in motion the blades will be rotated by the gearing just described from the traction wheel of the vehicle. Brace members 60 engage and surround the shaft 26 at either end thereof and are provided at their opposite ends with slotted portions engaging the shaft 54, these brace members serving to absorb and transmit the lateral thrust on the shaft 26 due to the cutting action of the blades to the shaft 54. One such brace member is shown in detail in Figure 6 of the drawings and is provided with an aperture 63 in one end thereof for engagement with the shaft 26 and a slot 64 in the opposite end which is arranged to fit loosely about the shaft 54. The slot 64 is of course of sufficient length to permit the rising and falling movement of the shaft 26 to an extent found necessary in practice.

Referring now to the cutting blades 23 and their relative disposition longitudinally of the machine which is of primary importance, it will be observed by reference to Figure 3 of the drawings that these blades are staggered, one being set in a position appreciably forward of the other in the direction of movement of the vehicle. The extent to which these blades are staggered or offset may be adjusted approximately before the machine is set in operation by shifting either or both blades on the supporting arms 25, apertures 70 being provided on the arm 25 and slots 71 being provided on the cutting blades through which bolts may be passed. The proper adjustment having been effected the bolts are tightened and the blades are maintained in a definite position on the ends of the arms, but the arms and the blades carried thereby may be shifted longitudinally of the machine during the operation thereof by the means about to be described.

This means consists of a bar 73 which is secured to the fork 31 engaging the collar 28 and which is provided with a toothed rack portion 75. Bar 73 extends through a slot in the rear leg of the vertically movable frame 34 and through a further slot in the rear end or base of a substantially U-shaped frame member 76 carried by the frame 34. As shown in Figure 1, a lever 78 is pivoted at 79 on the upper leg of the frame 76 and is provided at its lower extremity with an arcuate toothed segment 80 meshing with the rack teeth 75 so that operation of the lever 78 serves to move the collar 28, the arms 25 and the cutting blades carried thereby longitudinally of the shaft 26 to any desired position thereon, this operating mechanism rising and falling with the frame 34.

The operation of the machine will now be apparent from the above description. Referring to Figure 1 it will be observed that the blade 23 is cutting through and loosening the soil immediately to the rear of one of the plants. As the machine moves forwardly, that is to say to the right in Figure 1, the blade 22, which is displaced with respect to the blade 23 in the direction of movement of the machine will pass forwardly of the same plant as it moves down to make the succeeding cut so that the plant is not engaged or injured by either blade. The blade 23 will then make the next cut and by reason of the fact that it is displaced rearwardly with respect to the blade 22, the two cuts between the plants will overlap as shown in dotted lines in Figure 1. The operation of the machine will continue in this manner provided the plants are uniformly spaced, the forward blade 22 executing the first cut in front of each plant.

If it should happen that any adjacent pair of plants are more closely spaced than is indicated in Figure 1, the operator will grasp the handle 78 and after the blade 22 has executed the first cut in front of the leading plane he will shift the collar 28 and the arms 25 carried thereby rearwardly on the shaft 26 so that the cut made by the blade 23 will overlap to a greater extent the cut made by the preceding blade 22 so that the following plant will not be injured.

If, on the other hand, it happens that two adjacent plants are spaced to a greater extent than is shown in Figure 1, the operator will shift the rotating arms 25 forwardly after the blade 22 has made the first cut so that the subsequent cut made by the blade 23 will overlap the first cut to a less extent thus ensuring that all of the ground between the adjacent plants will be broken regardless of the fact that these plants are spaced at greater than normal distance.

While the machine has been described in the specification and illustrated in the drawings with some degree of particularity in order to facilitate an understanding of the invention, it will be appreciated that such variations of the construction are contemplated as fall within the spirit and scope of the appended claims.

Having thus described the invention, what is claimed as new and desired to be secured by Letters Patent is:

1. In an agricultural implement of the type which is designed to loosen the soil between spaced plants in a row, the combination with a frame adapted to be drawn along the row of plants, of a plurality of soil agitating elements, and a carrier for said elements rotatable about an axis extending longitudinally of the frame to pass said elements in succession through the soil, said elements being relatively displaced longitudinally of the frame to effect agitation of the soil by a plurality of series of strokes, the successive series of strokes being spaced to clear a plant and the strokes in each series overlapping.

2. In an agricultural implement of the type which is designed to loosen the soil between spaced plants in a row, the combination with a frame adapted to be drawn along the row of plants, of a plurality of soil agitating elements, a carrier for said elements rotatable about an axis extending longitudinally of the frame to pass said elements in succession through the soil, said elements being relatively displaced longitudinally of the frame to effect agitation of the soil by a plurality of series of strokes, the successive series of strokes being spaced to clear a plant and the strokes in each series overlapping, and means for shifting said carrier longitudinally of the frame to cause the strokes to overlap to a greater or less extent.

3. In an agricultural implement of the type which is designed to loosen the soil between spaced plants in a row, the combination with a frame adapted to be drawn along the row of plants, of a plurality of soil agitating elements, and a carrier for said elements rotatable about an axis extending longitudinally of the frame to pass said elements in succession through the soil, said elements being relatively displaced longitudinally of the frame to effect agitation of the soil by a plurality of series of strokes, the successive series of strokes being spaced to clear a plant and the strokes in each series overlapping, said elements being adjustable on said carrier to vary the relative longitudinal displacement thereof.

In testimony whereof I hereunto affix my signature.

EDWARD R. PERRY.